(12) United States Patent
Locher et al.

(10) Patent No.: US 7,897,235 B1
(45) Date of Patent: Mar. 1, 2011

(54) FIRE RETARDANT PANEL APPARATUS AND METHOD OF MAKING AND USING SAME

(75) Inventors: David M. Locher, Waukesha, WI (US); James E. Desing, Elkhorn, WI (US)

(73) Assignee: Milwaukee Composites, Inc., Oak Creek, WI (US)

( * ) Notice: Subject to any disclaimer, the term of this patent is extended or adjusted under 35 U.S.C. 154(b) by 1075 days.

(21) Appl. No.: 11/494,049

(22) Filed: Jul. 27, 2006

Related U.S. Application Data

(60) Provisional application No. 60/703,048, filed on Jul. 27, 2005.

(51) Int. Cl.
*B32B 3/02* (2006.01)

(52) U.S. Cl. ........... 428/76; 428/71; 52/309.4; 52/309.8; 52/309.13; 52/784.11; 52/793.1

(58) Field of Classification Search ................. 52/304.4, 52/309.8, 309.13, 309.16, 592.1, 784.11, 52/787.1, 793.1, 800.1; 428/71, 76, 166, 428/188
See application file for complete search history.

(56) References Cited

U.S. PATENT DOCUMENTS

| | | | | |
|---|---|---|---|---|
| 227,934 | A * | 5/1880 | Walton | 52/784.11 |
| 3,110,064 | A * | 11/1963 | Koontz | 52/521 |
| 3,121,262 | A * | 2/1964 | Loncoske | 181/290 |
| 3,476,422 | A * | 11/1969 | Campbell | 52/793.1 |
| 3,535,844 | A * | 10/1970 | Glaros | 52/592.1 |
| 4,396,142 | A | 8/1983 | Lines, Jr. et al. | |
| 4,463,043 | A * | 7/1984 | Reeves et al. | 428/68 |
| 4,534,886 | A * | 8/1985 | Kraus et al. | 252/502 |
| 4,557,961 | A | 12/1985 | Gorges | |
| 4,727,701 | A * | 3/1988 | Figari | 52/483.1 |
| 5,102,710 | A * | 4/1992 | Kaufman et al. | 428/71 |
| 5,462,623 | A | 10/1995 | Day | |
| 5,523,059 | A | 6/1996 | Langer | |
| 5,589,243 | A | 12/1996 | Day | |
| 5,600,930 | A | 2/1997 | Drucker | |
| 5,612,117 | A * | 3/1997 | Belanger et al. | 428/178 |
| 5,768,845 | A * | 6/1998 | Beaulieu et al. | 52/585.1 |
| 5,798,160 | A * | 8/1998 | Kohn | 428/56 |
| 5,834,082 | A * | 11/1998 | Day | 428/56 |
| 5,842,315 | A * | 12/1998 | Lin | 52/309.9 |
| 5,893,248 | A * | 4/1999 | Beliveau | 52/309.7 |
| 6,043,464 | A | 3/2000 | Berger et al. | |
| 6,085,485 | A * | 7/2000 | Murdock | 52/783.19 |
| 6,132,836 | A * | 10/2000 | Quinif | 428/68 |

(Continued)

FOREIGN PATENT DOCUMENTS

CN  1216592 A  5/1999

(Continued)

*Primary Examiner* — Brian E Glessner
*Assistant Examiner* — James J Buckle, Jr.
(74) *Attorney, Agent, or Firm* — Michael Best & Friedrich LLP

(57) ABSTRACT

A flame retardant panel apparatus, and method, utilize a flame retardant panel, having an exterior and an interior face thereof, with the panel including a panel structure having a primary core encapsulated within a panel frame of reinforced phenolic material, and a layer of flame retardant material attached to the panel structure and extending outwardly therefrom to at least partially define an exterior face of the flame retardant panel. The flame retardant panel is suitable for use in mass transit conveyances, such as subway cars, high speed cars, rail cars, buses, rapid response vehicles, marine vessels, and elevators.

32 Claims, 11 Drawing Sheets

U.S. PATENT DOCUMENTS

| | | |
|---|---|---|
| 6,224,835 B1 | 5/2001 | Langer |
| 6,274,647 B1 * | 8/2001 | Knight et al. .................. 523/179 |
| 6,311,456 B1 * | 11/2001 | Rodero Antunez .......... 52/794.1 |
| 6,458,418 B2 | 10/2002 | Langer et al. |
| 6,510,807 B2 | 1/2003 | Gottfried |
| 6,740,381 B2 | 5/2004 | Day et al. |
| 6,824,851 B1 * | 11/2004 | Locher et al. .................... 428/76 |
| 6,890,398 B2 * | 5/2005 | Sing .............................. 156/254 |
| 7,147,741 B2 * | 12/2006 | Sing .............................. 156/264 |
| 7,721,500 B2 * | 5/2010 | Clark et al. ..................... 52/455 |
| 2001/0012552 A1 * | 8/2001 | Cota ................................ 428/76 |
| 2002/0152697 A1 | 10/2002 | Hokkirigawa et al. |
| 2004/0172893 A1 * | 9/2004 | Hunter ............................ 52/200 |
| 2005/0074593 A1 | 4/2005 | Day et al. |
| 2007/0009704 A1 * | 1/2007 | Coppo ............................ 428/76 |
| 2007/0125044 A1 * | 6/2007 | Clark et al. ................. 52/784.11 |

FOREIGN PATENT DOCUMENTS

| | | |
|---|---|---|
| CN | 1378504 A | 11/2002 |
| CN | 1381657 A | 11/2002 |

* cited by examiner

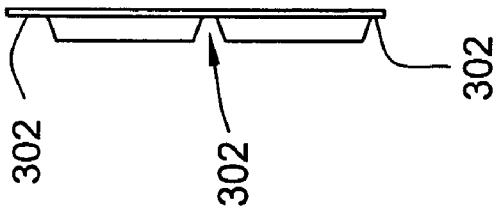
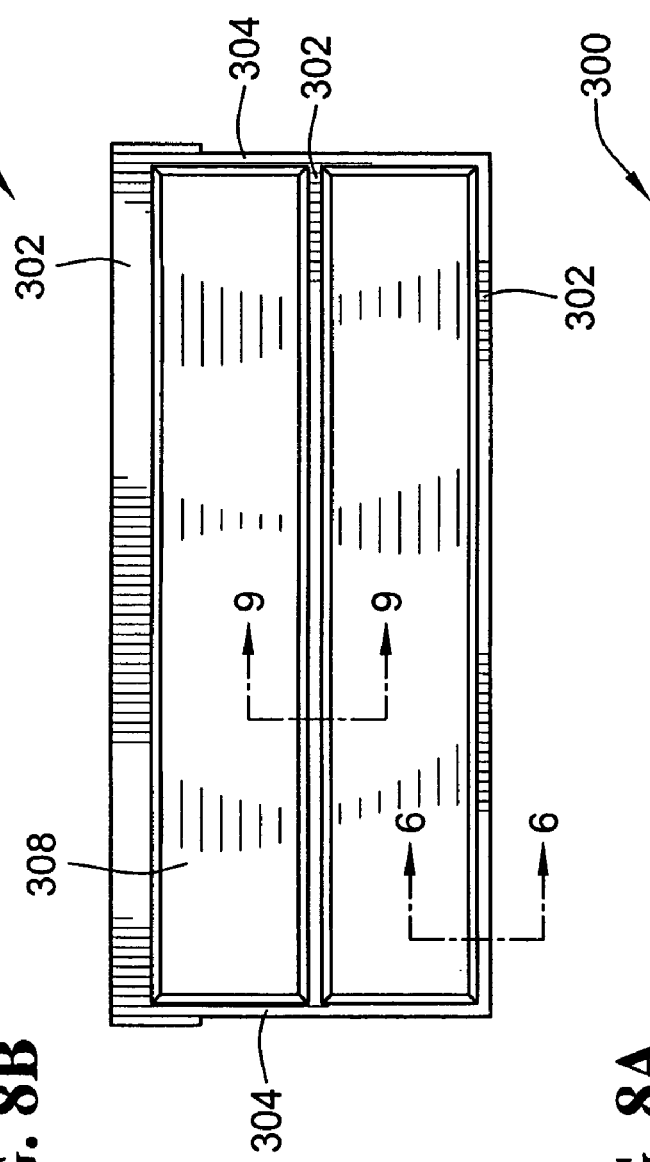
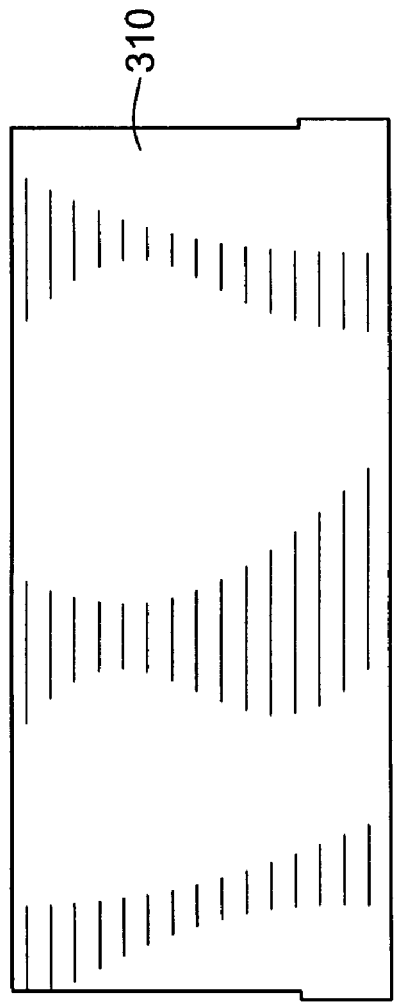

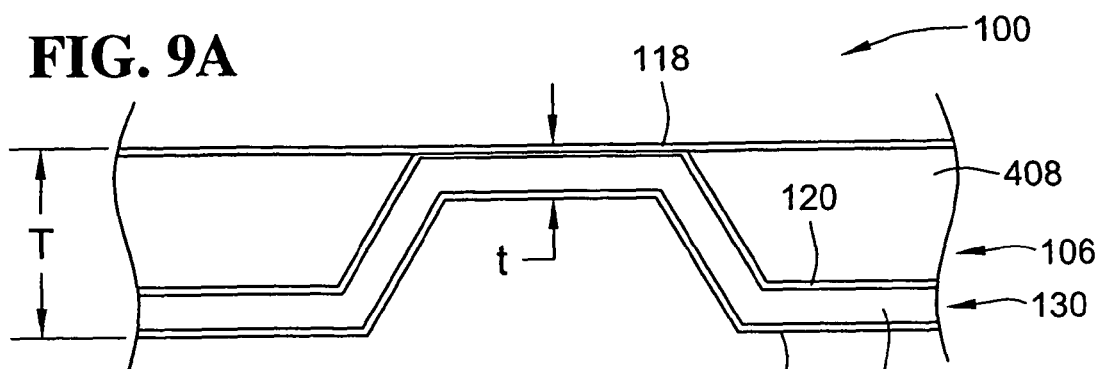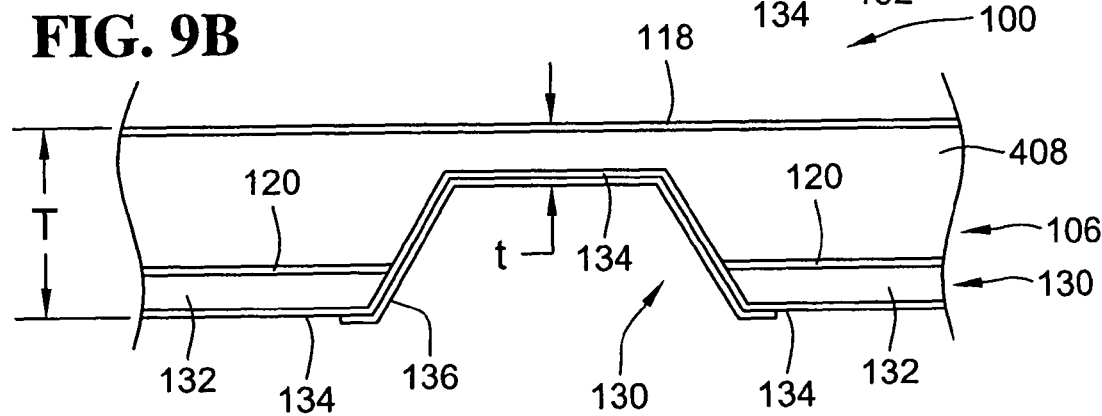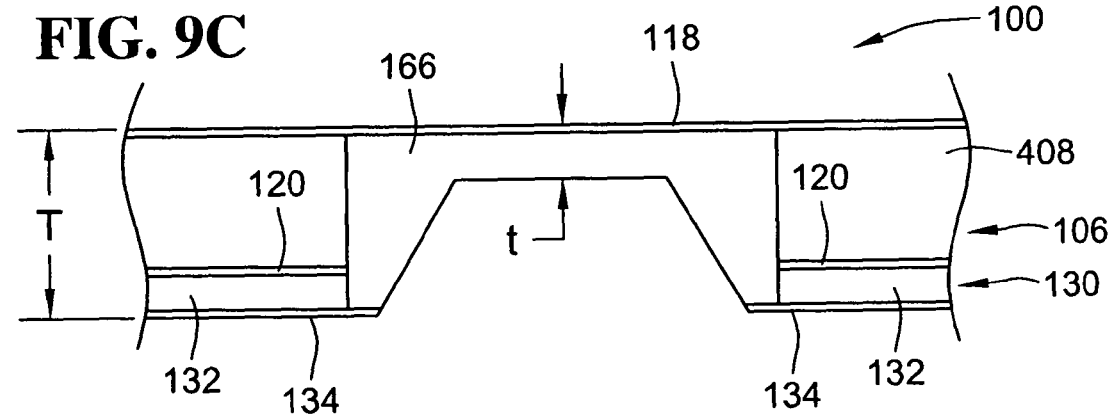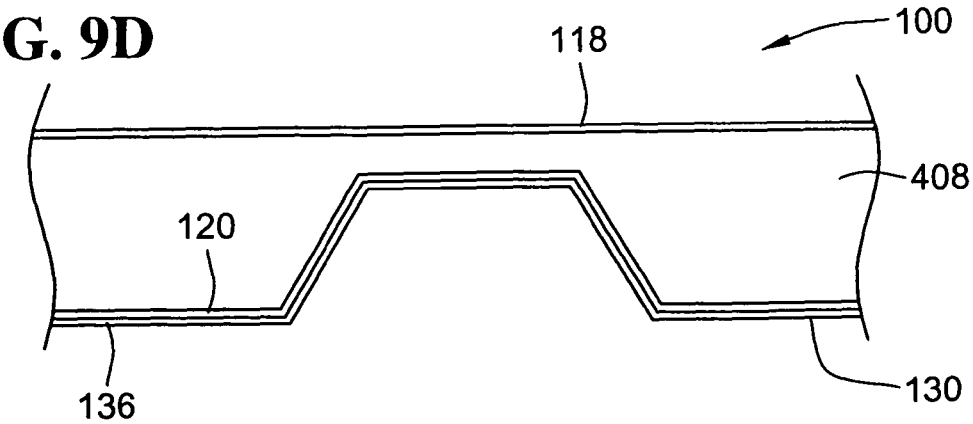

FIRE RETARDANT PANEL APPARATUS AND METHOD OF MAKING AND USING SAME

CROSS-REFERENCE TO RELATED PATENT APPLICATIONS

This patent application claims the benefit of U.S. Provisional Patent Application No. 60/703,048, filed Jul. 27, 2005, the disclosure and teachings of which are incorporated herein, by reference, in their entirety.

FIELD OF THE INVENTION

This invention relates generally to fire retardant panels, and more particularly to fire retardant panels suitable for use in mass transit conveyances, such as subway cars, high speed cars, rail cars, buses, rapid response vehicles, marine vessels, or elevator cars.

BACKGROUND OF THE INVENTION

Public conveyances, such as rail cars, buses, elevators, and the like, are typically subject to government regulations requiring that a passenger compartment of the conveyance be at least partially constructed from fire retardant panels, which provide protection for occupants of the compartment in the event that a fire should occur outside or within the passenger compartment.

For example, in the past, passenger rail cars and buses have sometimes utilized a flooring system in which floor panels, approximately three-quarters of an inch thick, are mounted to the top side of a floor-supporting underframe. Typically the floor panels have been attached to the underframe by various methods, including adhesive bonding, or fastening with screws or other fasteners. The underframe has typically been deep enough to allow a layer of insulation material (usually glass wool, fiberglass, or rock wool), to be laid upon the top surface of a series of thin steel sheets that are then welded to the bottom side of the underframe, to form an underpan assembly. The underframe is sometimes configured to be deep enough that there is an air gap provided between the underside of the floor panel and the insulation material on the top side of the steel underpan. The air gap serves as an insulation zone for heat transfer, in the event of a fire beneath the transit vehicle. Typically, in North America, such a floor structure is required to pass a fire endurance test for passenger fire safety, in which a completed flooring system is mounted over a pit in which a gas burner is located to simulate a fire beneath the vehicle. During the fire test, weights are placed on the top surface of the floor panels, to simulate a typical live floor loading resulting from carrying passengers.

In one common form of a floor panel, used in prior flooring systems for mass transit vehicles, a plywood sheet is sandwiched between, and bonded to, the interior surfaces of two stainless steel or aluminum sheets. This construction results in floor panels that are heavier than is desirable. Also, past experience has shown that, during operation of the mass transit vehicle, the plywood core sometimes is exposed to water, which causes the stainless steel or aluminum sheets to delaminate and the plywood panel to rot.

U.S. Pat. No. 6,824,851, which is assigned to the Assignee of the present invention, and is hereby incorporated in its entirety herein by reference, discloses an approximately three-quarter inch thick phenolic composite flooring system for mass transit vehicles, which provides significant improvement over flooring systems utilizing floor panels having stainless steel or aluminum sheets bonded to the faces of a plywood panel. By virtue of its construction, the phenolic composite flooring system disclosed in U.S. Pat. No. 6,824,851 is considerably lighter in weight than flooring systems utilizing plywood panels clad with stainless steel or aluminum sheets. Also, the flooring system of the '851 patent provides greater ability, than flooring systems using floor panels having a plywood sheet clad with stainless steel skins, to withstand harsh environmental conditions, such as exposure to water or moisture.

Although use of a phenolic composite flooring system, according to U.S. Pat. No. 6,824,851, in a traditional mass transit vehicle constructions, having an insulation material laid on the top surface of thin steel sheets welded to the bottom of a steel underframe to form an underpan assembly, have been shown to provide significant advantages over similar systems utilizing metal clad plywood floor panels, further improvement is desirable.

It is desirable to eliminate the insulation and heavy steel underpan, to reduce weight and complexity of the transit vehicle, and to eliminate the cost of the insulation, the steel underpan, and costs incurred in installing the insulation and underpan onto the underframe of the vehicle, while still providing sufficient flame retardant capability to meet governmental regulations.

Past experience has also shown that use of the air gap and steel underpan in previous mass transit vehicles created a cavity between the underpan and the floor panels which "drummed" during use of the mass transit vehicle. Elimination of the underpan and air gap would also eliminate the cavity, and potentially lead to a quieter passenger cab environment.

It has also been observed that previous, conventional underpan and underframe assemblies, would, from time-to-time, trap water between the bottom of the floor panel and the top side of the underpan. In some instances, large amounts of standing water would be trapped within the cavity between the underpan and the floor panels. As noted above, this standing water sometimes damage the floor panels, and could amount to significant dead weight which had to be carried by the mass transit vehicle.

It is desirable, therefore, to provide an improved fire retardant panel apparatus, and a method of making and using such an improved fire retardant panel apparatus, in a form which addresses one or more of the disadvantages of prior flooring systems for mass transit vehicles. It is further desirable to produce a fire retardant panel for use in other conveyances such as elevators and marine vessels. It is further desirable to provide an improved fire retardant panel, and panel apparatus, for use in defining one or more of the floor, ceiling, and/or walls of a conveyance for transporting passengers or other cargo.

BRIEF SUMMARY OF THE INVENTION

The invention provides an improved flame retardant panel apparatus, and method of making and using such an improved fire retardant panel apparatus, through use of a flame retardant panel, having an exterior and an interior face thereof, with the panel including a panel structure having a primary core encapsulated within a panel frame of reinforced phenolic material, and a layer of flame retardant material attached to the panel structure and extending outwardly therefrom to at least partially define an exterior face of the flame retardant panel.

Through use of a flame retardant panel, according to the invention, in a mass transit conveyance, such as a rail car or a bus, for example, the underpan and layer of insulation beneath the floor panel, of prior mass transit flooring systems, can be eliminated, while still providing an enhanced flame retardant capability which meets or exceeds applicable government standards. Through use of a flame retardant panel, according to the invention, weight and complexity of a mass transit flooring system are significantly reduced. In addition, a flame retardant panel, according to the invention, provides improved thermal insulation capabilities, and resistance to sound transmission, as compared to prior flame retardant panel constructions. Flame retardant panels, according to the invention, are also inherently more capable of withstanding exposure to water, and provide an improved moisture barrier, as compared to the metal clad plywood floor panels utilized in prior mass transit vehicles.

In one form of the invention, a flame retardant panel, according to the invention, has an exterior face thereof adapted for attachment to a support frame and an interior face thereof adapted for defining a boundary of a compartment. The flame retardant panel includes a panel structure and a layer of flame retardant material attached to the panel structure. The panel structure includes a primary core encapsulated within a panel frame of reinforced phenolic material. The primary core has first and second faces thereof and a periphery thereof. The panel structure further includes a panel frame including first and second skins, attached to the first and second faces of the primary core, and one or more closeouts disposed between the skins about the periphery of the core, with the one or more closeouts being attached to the periphery of the primary core and to the first and second skins. The layer of flame retardant material is attached to the second skin of the panel frame, and extends outwardly therefrom to at least partially define the exterior face of the flame retardant panel.

In some forms of the invention, the layer of flame retardant material includes a secondary core of material from the group consisting of balsa wood, phenolic foam, and melamine foam, and an additional skin of reinforced phenolic material. The secondary core is sandwiched between, and attached to, the second skin of the composite support structure and the additional skin. The additional skin is integrally joined to the remainder of the panel frame, to thereby fully encapsulate the secondary core within the reinforced phenolic material from which the panel frame is constructed.

In some forms of the invention, the layer of flame retardant material includes a layer of intumescent material attached to the second skin. The layer of intumescent material may be bonded onto the second skin. The layer of intumescent material may be a coating containing a intumescent material, which is sprayed, or otherwise applied onto the second skin. The layer of intumescent coating may also take the form of a composite structure, including an intumescent material disposed in a fibrous mat. In some forms of the invention, the layer of intumescent material includes a cured epoxy resin to form a pre-cured layer of intumescent material which is adhesively bonded to the second skin, utilizing an epoxy or other suitable type of adhesive. In some forms of the invention, the layer of intumescent material is impregnated with phenolic resin and placed against the second skin of reinforced phenolic resin, while the second skin is in an uncured state. The impregnated layer of intumescent material and the second skin are then co-cured. Co-curing of the impregnated intumescent material with the second skin, may be carried out contemporaneously with curing of the remainder of the panel frame of reinforced phenolic material.

In some forms of the invention, the primary core of the panel structure may include a plastic closed cell foam of polyisocyanurate material. The primary core may also be formed from other appropriate materials such as balsa wood.

In some forms of the invention, the panel structure may include one or more ribs of reinforced phenolic material connecting the first and second skins to one another, and disposed inwardly from the periphery of the primary core. The primary core may be a pre-cured reinforced core, including at least one reinforced phenolic rib and two or more foam strips, with the at least one phenolic rib being positioned between two adjacent ones of the two or more foam strips. Alternatively, the primary core may include a plurality of groupings, each formed from a plurality of plastic foam strips helically wound together in a side-by-side relationship, by rovings of fibrous material. The groupings may be disposed in a side-by-side relationship with one another, and joined together by first and second adhesive scrims applied to first and second faces of the primary core, such that facing and faying portions of the fibrous rovings of adjacent groupings form reinforcements for the reinforced phenolic ribs.

A fire retardant panel, according to the invention, may define a longitudinal axis thereof, a transverse axis thereof extending substantially perpendicularly to the longitudinal axis, and a thickness thereof extending substantially orthogonally to both the longitudinal and transverse axes of the panel, with both the longitudinal and transverse axes lying substantially within a plane defined by the interior face of the panel. The first and second skins may take the form of a stitched composite reinforcing structure of fibrous material, impregnated with phenolic resin. The reinforcing structure of the skins may have first, second and third layers, with the first layer being disposed adjacent the primary core and comprised of substantially randomly directed fibers, the second layer being disposed against the first layer and comprising substantially longitudinally directed fibers, and the third layer being disposed against the second layer and comprising substantially transversely directed fibers, with the first, second, and third layers being stitched together by stitching extending at least partially orthogonally to the longitudinal and transverse axes.

In forms of the invention having an additional skin of reinforced phenolic material, the additional skin may also be constructed as described in the preceding paragraph, with the first layer of the reinforcing structure of the additional skin being attached to the secondary core.

A flame retardant panel, according to the invention, may also include a surfacing veil disposed against the third layer of the reinforcing structure of one of the first, second, or additional skins of reinforced phenolic material.

One or more of the one or more closeouts, in a flame retardant panel, according to the invention, may be machineable to include at least one mating surface. The mating surface may be a lap joint.

Where the interior face, of a flame retardant panel, according to the invention, defines a plane of the panel, a closeout, according to the invention, may include at least one bore therethrough extending substantially perpendicularly to the plane of the panel. The primary core, in a flame retardant panel, according to the invention, may include at least one tapping block, with the tapping block including a block of reinforced phenolic material and a metal plate encapsulated within the block. The tapping plate may be adapted to be drilled and tapped, so as to provide the panel with a mounting area.

A flame retardant panel, according to the invention, may include a heating element adjacent to the interior face of the panel. The heating element may be embedded into the first skin of the panel, and integrally joined thereto by the phenolic material. The heating element may also be adhesively bonded onto the first skin of the panel, using an appropriate adhesive. The heating element may be encapsulated within a sheath of urethane material, and be adhesively bonded to the first skin with an epoxy adhesive, or another appropriate adhesive.

A flame retardant panel, in accordance with the invention, may include a conduit embedded within the panel and having first and second openings into the conduit through at least one of the interior and/or exterior faces of the panel or the perimeter such that the conduit continues from panel to panel.

The invention may also take the form of a flame retardant panel apparatus, having multiple interconnected panels, each including an exterior face thereof adapted for attachment to a support frame and an interior face thereof adapted for defining a boundary of a compartment, with at least one of the panels of the flame retardant panel apparatus being a flame retardant panel according to the invention.

A flame retardant panel apparatus, in accordance with the invention, may take the form of a flooring apparatus for a conveyance. The conveyance may be an elevator, including a floor support structure adapted for attachment thereto of the flooring apparatus according to the invention. The conveyance may be a vehicle or a vessel including a floor support structure adapted for attachment thereto of a flooring apparatus according to the invention. The vehicle or vessel may be a mass transit vehicle or vessel.

The invention may also take the form of a method for constructing and/or using a flame retardant panel, or a flame retardant panel apparatus, in accordance with the invention.

In one form of the invention, a method is provided for constructing a flame retardant panel, having an exterior face thereof adapted for attachment to a support frame and an interior face thereof adapted for defining a boundary of a compartment. The method includes forming a panel structure, and attaching a layer of flame retardant material to the panel structure. The panel structure is formed by encapsulating a primary core within a panel frame of reinforced phenolic material, in such a manner that the primary core has first and second faces thereof, and a periphery thereof, and such that the panel frame includes first and second skins attached to the first and second faces of the primary core and one or more closeouts disposed between the skins about the periphery of the primary core, with the one or more closeouts being attached to the periphery of the primary core and to the first and second skins. The layer of flame retardant material is attached to the second skin of the panel frame and extends outwardly therefrom, such that the layer of flame retardant material at least partially defines the exterior face of the panel.

A method, according to the invention, may include forming the layer of flame retardant material from a secondary core, and an additional skin of reinforced phenolic material, where the secondary core is formed from a material selected from the group consisting of balsa wood, phenolic foam, and melamine foam. The method includes attaching the secondary core between the second skin of the panel structure and the additional skin. A method, according to the invention, may further include integrally joining the additional skin to the remainder of the panel frame, of the panel structure, to thereby fully encapsulate the secondary core within the reinforced phenolic material of the panel frame.

Alternatively, a method for constructing a flame retardant panel, in accordance with the invention, may include forming the layer of flame retardant material by attaching an intumescent material to the second skin of the panel structure.

In some forms of the invention, the thickness of a fire retardant panel, according to the invention, may vary and include at least a first and a second thickness thereof, within the periphery of the primary core. The layer of flame retardant material attached to the second skin of the panel frame and extending outwardly therefrom to at least partially define the exterior surface of the panel may extend across the entirety of the exterior face of the panel, throughout both the first and second thicknesses of the panel. Alternatively, the layer of flame retardant material attached to the second skin of the panel frame and extend outwardly therefrom to at least partially define the exterior surface of the panel may extend only partially across the entirety of the exterior face of the panel, throughout one, but not both of the first and second thicknesses of the panel. In some forms of the invention, a first flame retardant structure may be utilized in areas of the panel having the first thickness, and a second flame retardant structure may be utilized in areas of the panel having the second thickness. For example, a flame retardant structure including a secondary core of flame retardant material may be utilized in areas of the panel having the first thickness, and a second flame retardant structure including an intumescent material may be utilized in areas of the panel having the second thickness.

Similarly, even where the panel has a substantially uniform thickness, the layer of flame retardant material may include first and second sections thereof having different flame retardant structures. For example, the first section of the layer of flame retardant material may be formed from a secondary core and an additional skin, according to the invention, with the second section of the layer of flame retardant material being formed from an intumescent material attached to the second skin of the panel structure in the second section of the flame retardant layer.

Other aspects, objects and advantages of the invention will be apparent from the following detailed description and accompanying drawings of exemplary embodiments of the invention.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIGS. 8A-8C are respectively top, bottom, and end views of an exemplary embodiment of a fire retardant floor panel, according to the invention, having sections of greater and lesser thickness to facilitate installation of the floor panel onto a support structure;

FIGS. 9A-9D are alternate partial cross-sectional views taken along line 9-9 in FIG. 8B, illustrating construction details of alternate embodiments of fire retardant panels, according to the invention, having areas of greater and lesser thickness located inwardly from the edges of the panel.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
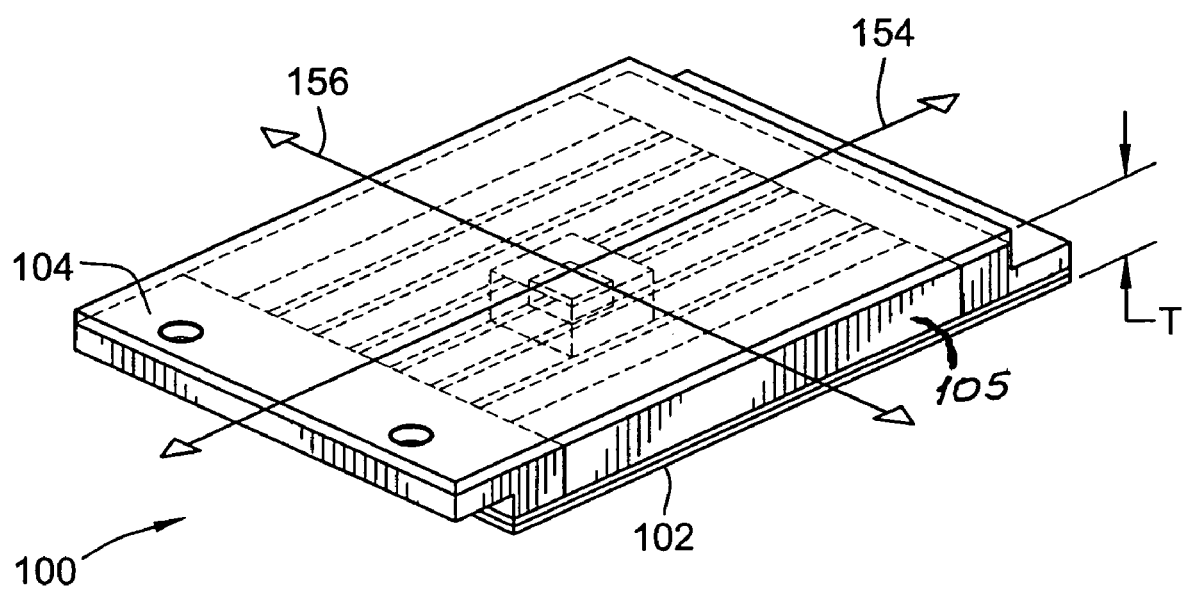
FIG. 1 is a perspective illustration of a first exemplary embodiment of a fire retardant panel, in accordance with the invention.
Figure 2:
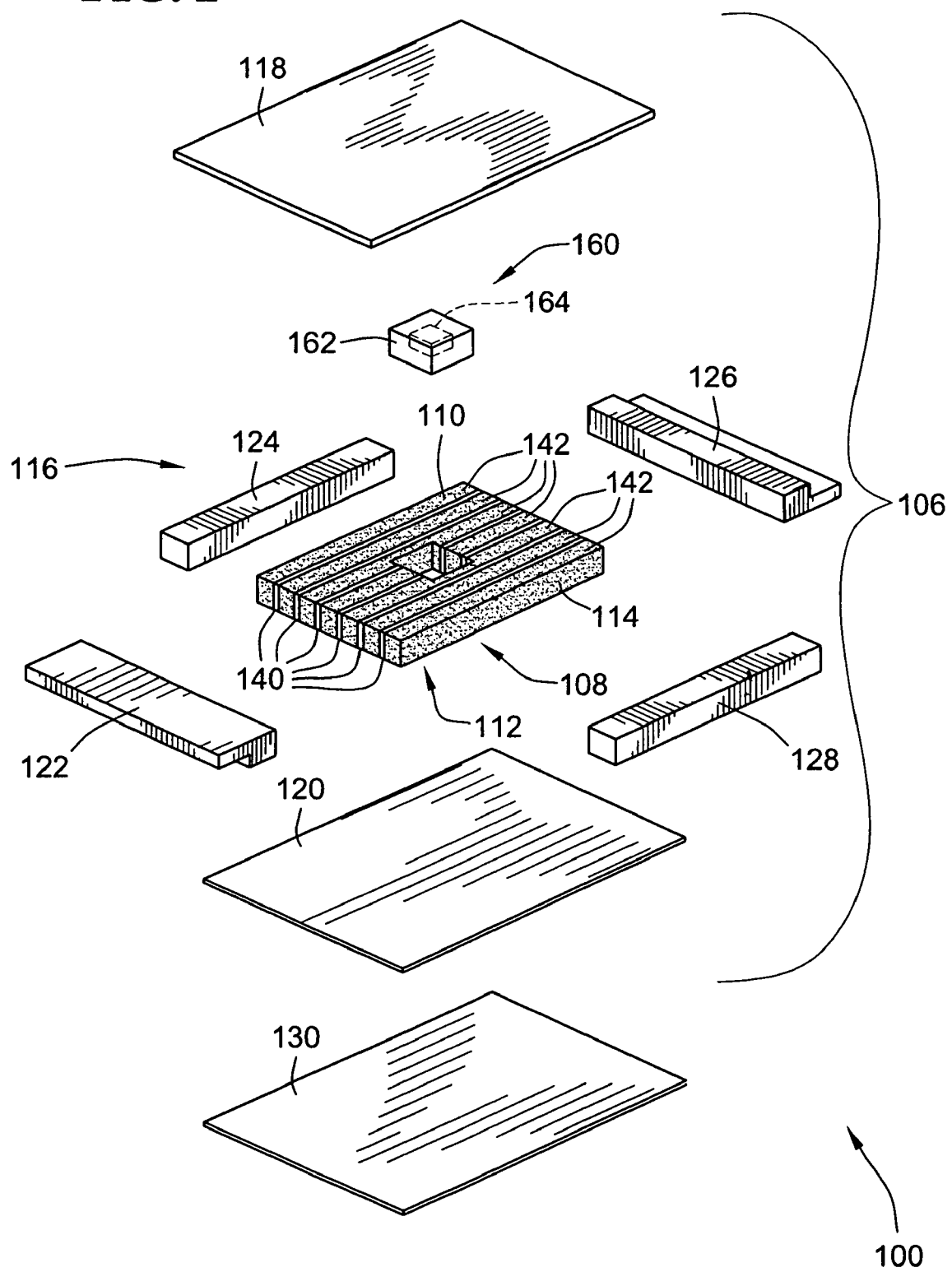
FIG. 2 is an exploded perspective illustration, showing the internal components and construction of the exemplary embodiment of the fire retardant panel shown in FIG. 1.

FIGS. 1 and 2 illustrate a first exemplary embodiment of a flame retardant panel 100, according to the invention, with FIG. 1 showing the flame retardant panel in a completed state, ready for attachment to a support frame, and FIG. 2 illustrating various components of the flame retardant panel 100 in an exploded perspective fashion.

As shown in FIGS. 1 and 2, the first exemplary embodiment of a flame retardant panel 100, according to the invention, has an exterior face 102 thereof, adapted for attachment to a support frame (not shown), an interior face 104 thereof, adapted for defining a boundary of a compartment and a perimeter 105 thereof extending around the panel 100 between the interior and exterior faces 104, 106 of the panel 100. The flame retardant panel 100 includes a panel structure 106 including a primary core 108 having first and second faces 110, 112 thereof and a periphery 114 thereof. In the first exemplary embodiment of the flame retardant panel, as illustrated in FIG. 2, the primary core 108 has essentially a planar shape, with the first and second faces 110, 112 forming spaced parallel planes, and the periphery 114 being substantially rectangular in shape. In other embodiments of the invention, flame retardant panels, and components thereof may have shapes differing considerably from those illustrated in the exemplary embodiment of the flame retardant panel 100 shown in FIGS. 1 and 2.

In the panel structure 106 of the exemplary embodiment 100, the primary core 108 is encapsulated within a panel frame of reinforced phenolic material, (illustrated generally by reference numeral 116 in FIG. 2), formed by the combination of first and second skins 118, 120, attached to the first and second faces 110, 112 of the primary core 108, and four closeouts 122, 124, 126, 128, disposed between the skins 118, 120 about the periphery 114 of the primary core 108. The four closeouts 122, 124, 126, 128 are attached to the periphery 114 of the primary core 108, and to both the first and second skins 118, 120.

A layer of flame retardant material 130 is attached to the second skin 120 of the panel frame 116, and extends outwardly from the second skin 120, to at least partially define the exterior face 102 of the flame retardant panel 100. The flame retardant layer 130 is illustrated as a solid slab in FIG. 2, but as will be understood from the description below, in various embodiments of the invention the layer of flame retardant material 130 may take a variety of forms and include multiple elements thereof.

Figure 3:
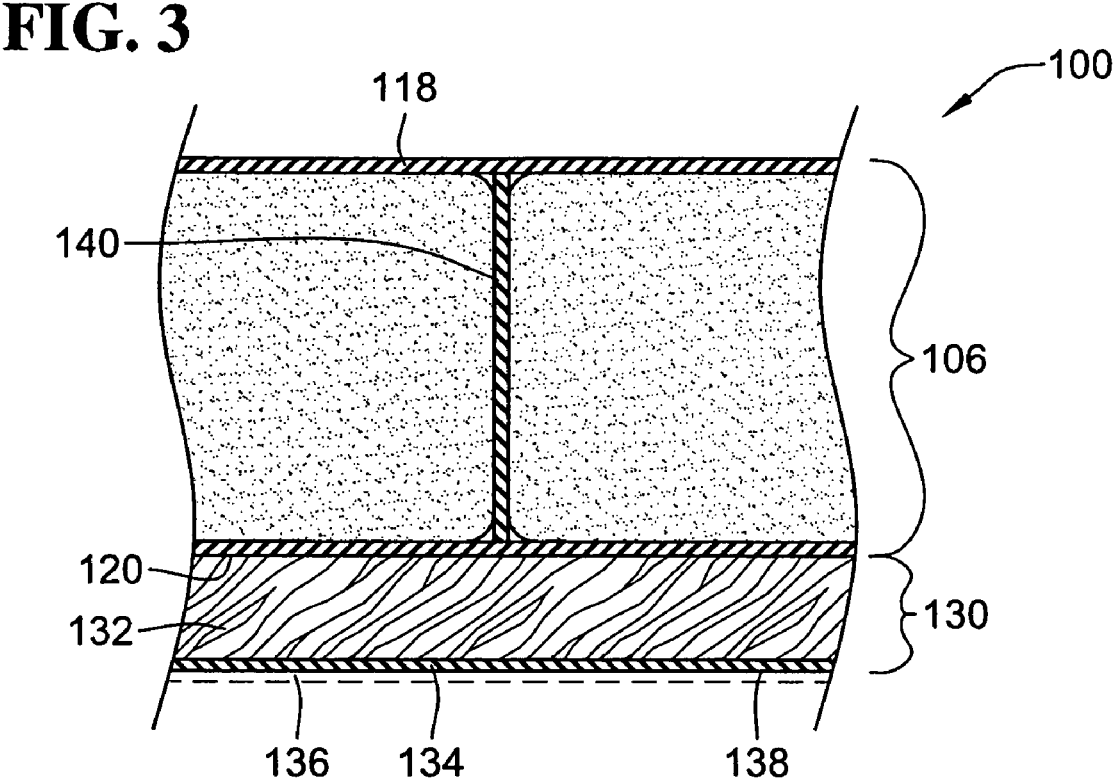
FIG. 3 is a partial cross-sectional illustration of an exemplary embodiment of a fire retardant panel, according to the invention, which includes a fire retardant layer having a secondary core of fire retardant material.

As shown in FIG. 3, for example, the layer of flame retardant material 130 may include a secondary core 132 formed from material selected from the group consisting of balsa wood, phenolic foam, and melamine foam. In the embodiment shown in FIG. 3, the layer of flame retardant material further includes an additional skin 134 of reinforced phenolic material, with the secondary core 132 being sandwiched between and attached to the second skin 120 of the composite support structure 106 and the additional skin 134. The additional skin 134 is integrally joined to the remainder of the panel frame 116, by the closeouts 122, 124, 126, 128, to thereby fully encapsulate the secondary core 132 within the reinforced phenolic material comprising the panel frame 116.

The choice of materials for the secondary core 132 will be dependent upon a variety of factors, unique to a particular embodiment and application of the present invention. Such factors as the thickness of the primary core 108, and the secondary core 132 are relevant in making the choice of materials for both the primary and secondary cores 108, 132.

In general, it is contemplated that the primary core 108 of the present invention will have a substantially greater thickness than the core of the applicant's '851 floor panel. For example, it is contemplated that, in practicing the present invention, it may be desirable to have the primary core have a thickness in the range of two inches, or more, to enhance thermal resistance, acoustic resistance, and structural strength of the fire retardant panel 100. It is noted, however, that the invention may be practiced in fire retardant panels 100, having an overall thickness T of ¾ of an inch, for example.

Specifically, with regard to factors considered in selecting a material for a secondary core 132, according to the invention, it is generally contemplated that a preferred thickness for the secondary core would be in the range of ¼ to ¾ inches, with a nominal ½ inch thickness being generally acceptable. The invention may be practiced, however, with secondary cores 132 having substantially greater or lesser thicknesses than these. It is also contemplated, that in some embodiments of the invention, the secondary core 132 may have a thickness which is substantially greater than the thickness of the primary core 108. For example, where it is desirable to have a floor panel of a mass transit conveyance have a thickness of ¾ of an inch above a floor support frame, to match the thickness of prior floor panels, the panel structure 106 of a flame retardant floor panel, according to the invention, may have an overall thickness, across the first and second skins and primary core 118, 120, 108, of ¾ of an inch, with the secondary core 132 and additional skin 134 extending a larger distance, such as two to three inches, for example, below the second skin 120 of the panel structure 106.

In general, balsa wood will have the lowest cost of any of the materials listed above, for use as a secondary core 132, according to the invention. Phenolic foam will typically cost somewhat more than balsa wood, but provides enhanced thermal insulation, as compared to the same thickness of balsa wood. Melamine foam, also typically costs more than balsa wood, but provides superior acoustic insulation, as compared to balsa wood. Generally therefore, where lowest cost is a primary objective, it is contemplated that a secondary core 132 of balsa wood will be preferred, in practicing the invention. Where enhanced thermal performance is desired, a secondary core of phenolic foam may be preferable. Where enhanced acoustic damping performance is required, a secondary core of melamine foam may be the preferred choice.

As an alternative to having the additional skin 134 integrally joined to the remainder of the panel frame 116 by the closeouts 122, 124, 126, 128, secondary closeouts of reinforced phenolic material (not shown) may be positioned about all, or a portion of the periphery of the secondary core 132, in alternate embodiments of the invention. Alternatively, the additional skin 134 may be configured to wrap around the edges of the secondary core 132, for attachment to the remainder of the panel frame 116, in a manner which fully encapsulates the secondary core 132 within the reinforced phenolic material comprising the panel frame 116 and the additional skin 134.

As indicated by a dashed line, in FIG. 3, in alternate embodiments of the invention, the layer of flame retardant material 130 may further include a layer of intumescent material 136 attached to a second face 138 of the additional skin 134. The layer of intumescent material 136 may take a variety of forms, bonded onto the second face 138 of the additional skin 134. For example, the layer of intumescent material 136 may take the form of a coating containing an intumescent material which is sprayed onto, or otherwise applied to the second face 138 of the additional skin 134. Alternatively, the layer of intumescent material 136 may be a composite structure including an intumescent material disposed in a fibrous mat. Such materials are disclosed in U.S. Pat. No. 5,523,059, for example. One such material, having an unexpanded exfoliating intumescent material disposed in a fiber mat is sold under the trade name, Technofire®, by Technical Fibre Products of Newburgh, N.Y., US. In some forms of the invention, the fibrous mat having the intumescent material disposed therein is impregnated with a resin, such as an epoxy, to form a pre-cured layer of intumescent material, which is then bonded to the second face 138 of the additional skin 134 with an adhesive, such as an epoxy. In other embodiments, the fibrous mat containing the intumescent material is impregnated with phenolic resin and placed against the second face 138 of the additional skin 134, while the additional skin 134 is in an uncured state, and the layer of intumescent material 136 and the additional skin 134 are co-cured.

The choice of attaching the fibrous mat containing intumescent material 136 to the additional skin 134 by co-curing, or alternatively by attaching a pre-cured layer 136 of intumescent material to the additional skin 134 may be made as a function of how rapidly it is desired that the intumescent material be activated. Specifically, phenolic resins have higher temperature capabilities then epoxy resins, and will slow the rate at which the intumescent material begins to expand out of the layer of intumescent material 136.

Where the layer of intumescent material 136 is provided by applying a coating to the second surface 138 of the additional skin 134, either ceramic based or non-ceramic based intumescent coatings may be used in practicing the invention. Suitable intumescent coatings, for use in practicing the invention, are available from Micro Phase Coatings, Inc. of Garner, N.C., US. or Avtec Industries of Hudson, Mass., US.

Figure 4:
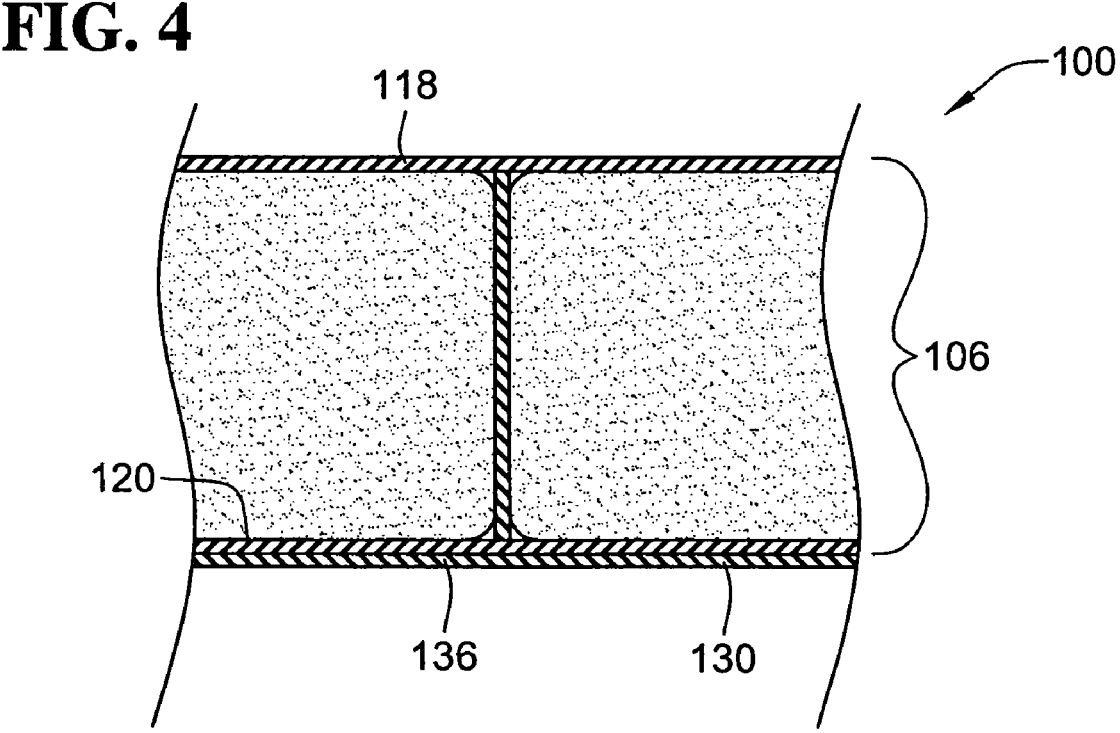
FIG. 4 is a partial cross-sectional view of an exemplary embodiment of the invention having a layer of intumescent material at least partially defining an exterior face of a flame retardant panel, according to the invention.

FIG. 4 illustrates a variation of the first exemplary embodiment of the flame retardant panel 100, in which the layer of flame retardant material 130 is formed by a layer 136 of intumescent material which is attached directly to the second skin 120 of the panel structure 106. The layer of intumescent material 136 utilized as shown in FIG. 4, may take any of the forms and be attached by any of the methods described above in relation to the embodiment shown in FIG. 3.

As shown in FIGS. 2-4, the first exemplary embodiment of the flame retardant panel 100 also includes one or more ribs 140 of reinforced phenolic material connecting the first and second skins 118, 120 to one another. The ribs 140 are disposed inwardly from the periphery 114 of the primary core 108.

In the exemplary embodiment 100 shown in FIG. 2, the primary core 108 is a pre-cured reinforced core, including a plurality of the reinforced phenolic ribs 140 alternated with a plurality of foam strips 142, with the phenolic ribs 140 being generally positioned between two adjacent ones of the foam strips 142. The construction of such a pre-cured reinforced core is disclosed in detail in commonly assigned U.S. Pat. No. 6,824,851 B1, which has hereinabove been incorporated into the disclosure of the present invention by reference.

In manufacturing a fire retardant panel, according to the present invention, utilizing the pre-cured reinforced core 108, the various components of the fire retardant panel 100 are stacked in a platen press, substantially in the manner indicated in FIG. 2, with uncured phenolic resin being applied between the various components where it is desired to have the components adhere to one another, and the stacked uncured structure is subjected to pressure and heat to cure the phenolic material to thereby integrally bond the components of the fire retardant panel 100 to one another.

Figure 5:
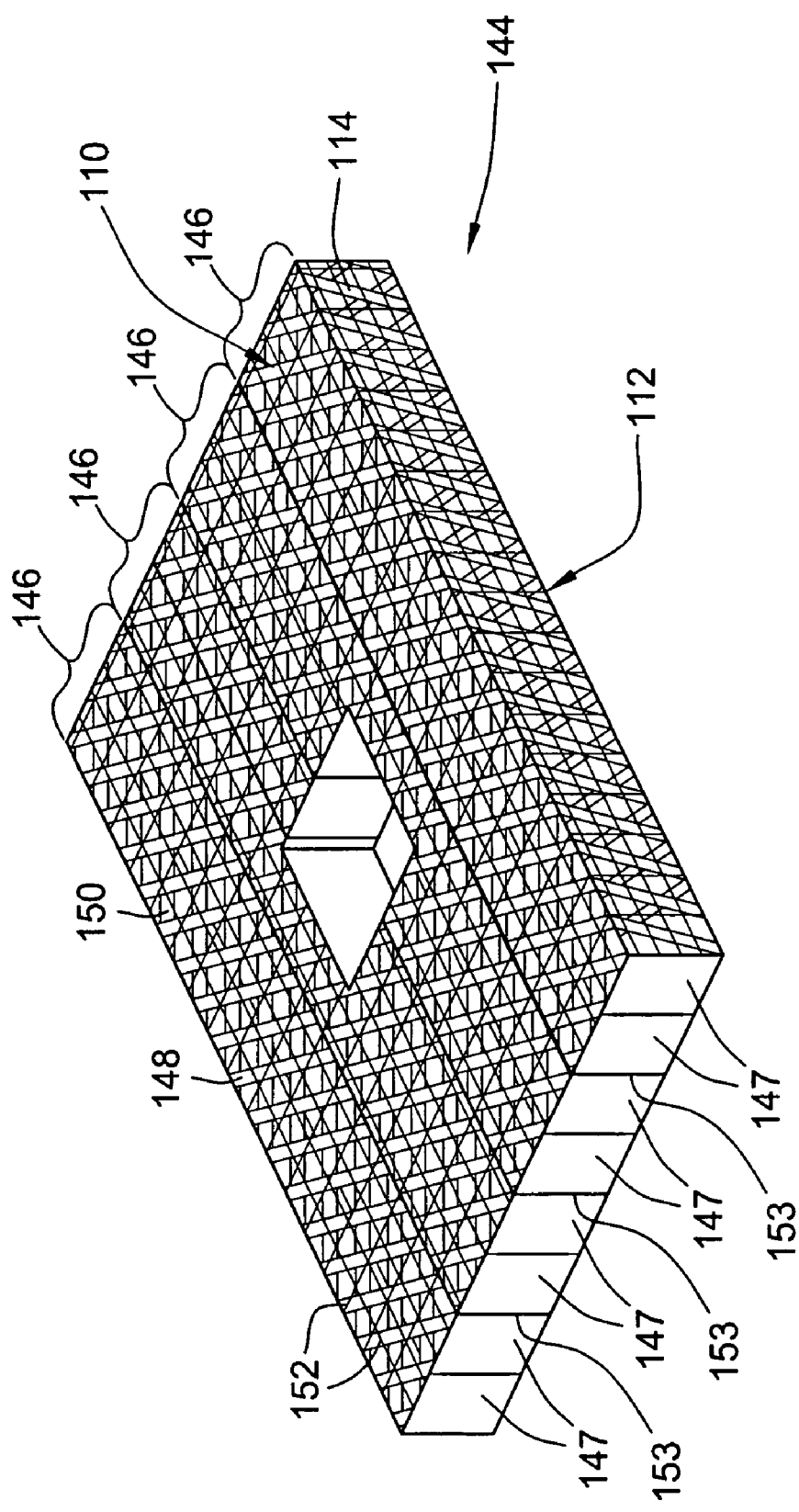
FIG. 5 is a perspective illustration of an alternate embodiment of a primary core of the exemplary embodiment of the fire retardant panel shown in FIG. 1.

In practicing the present invention, it is not required to use a pre-cured core, of the type disclosed in the common assignee's U.S. Pat. No. 6,824,851 B1. In an alternate embodiment of a primary core 144, in a fire retardant panel, according to the invention, illustrated in FIG. 5, the primary core 144 comprises four groupings 146, each formed from two plastic foam strips 147 which are bond together in a side-by-side relationship by an overwind of helically directed rovings 148, 150 of fibrous material. The rovings 148, 150 are more-or-less oppositely directed, and placed in alternating layers, such that the plastic foam strips 147 in each grouping are relatively tightly bound together by the rovings 148, 150. The groupings 146 are disposed in a side-by-side relationship with one another, and joined by first and second scrims 152 adhesively bonded respectively to the first and second faces 110, 112 of the primary core 144, in such a manner that faying portions 153 of the fibrous rovings 148, 150 form dry, un-impregnated reinforcements for the reinforced phenolic ribs 140.

When constructing the flame retardant panel 100, utilizing the alternate primary core 144, the various components of the flame retardant panel 100 are stacked into a platen press, along with the primary core 144 in the same manner as described above for a flame retardant panel 100 utilizing a pre-cured primary core 108, and additional un-cured phenolic resin is applied to the first and second faces 110, 112 of the core 144. During the curing process, application of pressure and heat causes the uncured phenolic resin to flow into the rovings 148, 150 and through the reinforcements 153 formed by adjacent groupings 146, to thereby form the reinforced phenolic ribs 140.

In practicing the invention, where the fire retardant panel 100 defines (see FIG. 1) a longitudinal axis 154 thereof, a transverse axis 156 thereof extending substantially perpendicularly to the longitudinal axis 154, and a thickness T thereof extending substantially orthogonally to both the longitudinal and transverse axes 154, 156 of the panel 100, with both the longitudinal and transverse axes 154, 156 lying substantially within a plane defined by the interior face 104 of the panel 100, the first and second skins 118, 120 may include a stitched composite reinforcing structure (not shown) of fibrous material, impregnated with phenolic resin. As is known in the art, the reinforcing structure of the skins 118, 120 may have first, second, and third layers, with the first layer being disposed adjacent the primary core 108 (144) and including only substantially randomly directed fibers, the second layer being disposed against the first layer and comprising substantially only longitudinally directed fibers, and the third layer being disposed against the second layer and comprising substantially only transversely directed fibers, with the first, second, and third layers being stitched together by stitching extending at least partially orthogonally to the longitudinal and transverse axes 154, 156. In embodiments of the invention utilizing an additional skin 134, the additional skin 134 may also include a three-layered stitched composite reinforcing structure of fibrous material, impregnated with phenolic resin, of the type described hereinabove with regard to the first and second skins 118, 120, with the first layer of the reinforcing structure of the additional skin 134 being disposed against the secondary core 132.

A flame retardant panel, according to the invention, may further include a surfacing veil (not shown), as is known in the art, disposed against at least one of the first, second, or additional skins 118, 120, 134, adjacent either the exterior or interior face 102, 104 of the flame retardant panel 100.

Figure 6A:
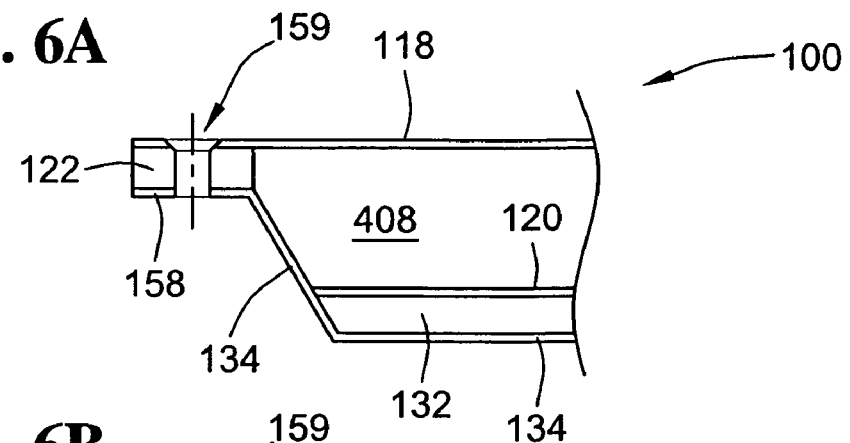
FIGS. 6A-6D are partial cross-sectional illustrations of an edge of a flame retardant panel, according to the invention, taken along line 6-6 in FIG. 8B, illustrating construction details of several alternate embodiments of the invention.
Figure 6B:
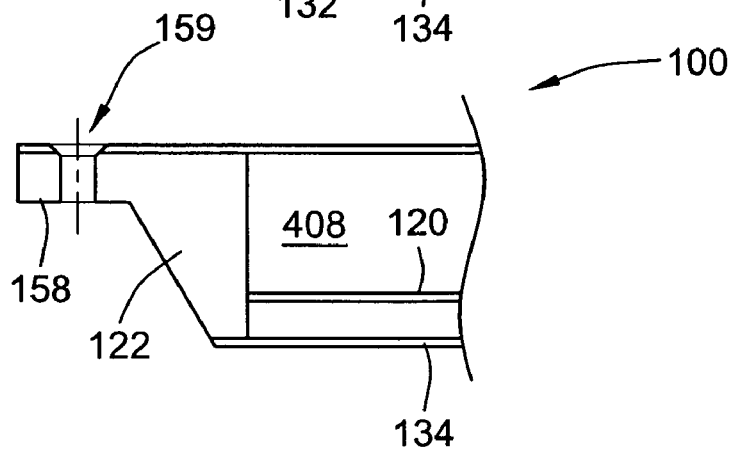
Figure 6C:
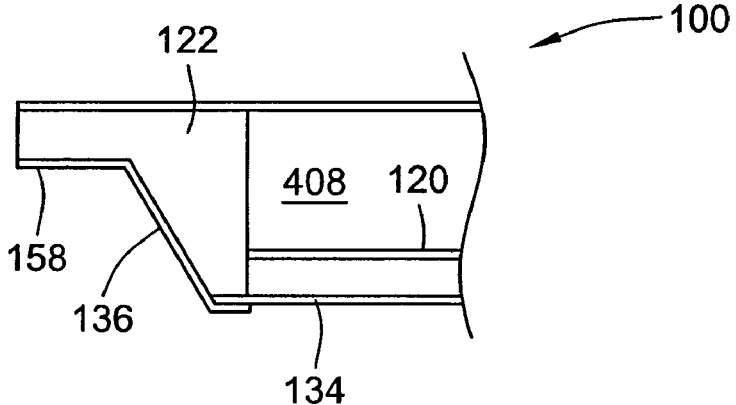
Figure 6D:
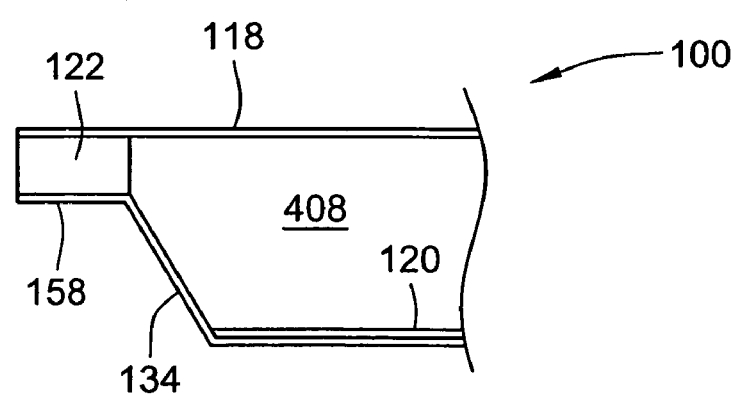

As illustrated in FIGS. 6A-6D, one or more of the closeouts 122, 124, 126, 128, of the first exemplary embodiment of the fire retardant panel 100, may be machineable to include at least one mating surface 158, such as the lap joint shown in FIGS. 6A-6D. As shown in FIG. 1, and FIGS. 6A and 6B, the closeout 122, in the completed panel 100, includes a pair of bores 159 extending therethrough in a direction substantially perpendicularly to the plane of the panel 100 defined by the longitudinal and transverse axes 154, 156. The closeouts 122, 124, 126, 128, may also take a variety of forms, as illustrated in FIGS. 6A-6D. FIGS. 6A-6D also illustrate other details of various alternate embodiments of the invention, in which the fire retardant panel 100 includes a beveled surface, either as part of or adjacent to the closeout 122.

FIGS. 6A-6D further illustrate various alternate embodiments, and placements of components in the fire retardant layer. For example, in FIG. 6C, a layer of intumescent material 136 is utilized on the mating surface 158 and angled side of the panel 100, in combination with a fire retardant layer having a secondary core and additional skin 134. In FIGS. 6A-6D, and also in FIGS. 9A-9D, as described below, the primary core of the various alternate illustrated embodiments has been designated with reference numeral 408, to indicate that the primary core 408 may take the form of the exemplary cores 108, or 144, as described hereinabove, or any other form within the scope of the invention.

In similar fashion, the primary core 108 (144) may also include a variety of materials, additional components, and have configurations other than those specifically illustrated herein. In some embodiments of the invention, the primary core 108 (144) may include a plastic closed cell foam of polyisocyanurate material. The primary core 108 (144) may also be fabricated from a variety of other appropriate materials, such as balsa wood.

As shown in FIG. 2, the primary core 108 (144) may further include at least one tapping block, including a block 162 of reinforced phenolic material, and a metal plate 164 encapsulated within the block 162. The tapping plate 164 is adapted to be drilled and tapped so as to provide a mounting area, for seating arrangements, for example, in the flame retardant panel 100.

FIGS. 7A-7E illustrate a flame retardant panel apparatus, in the form of a flooring apparatus 200 of a conveyance, illustrated by an under floor support frame 202 of a passenger rail car. The flame retardant floor panel apparatus 200 includes multiple interconnected panels, in the form of a center panel 204 and a pair of identical, reversible, end panels 206. Each of the multiple interconnected panels 204, 206, 206 includes an exterior face 208 thereof, adapted for attachment to the support frame 202 and an interior face 210 thereof adapted for defining a boundary, in the form of a floor, of a passenger compartment (not shown). In the panel apparatus 200, all of the panels 204, 206, 206 are flame retardant panels, constructed in accordance with the present invention.

In general, the flame retardant panels 204, 206, 206 of the flooring apparatus 200 are constructed in the same manner as described hereinabove with regard to the first exemplary embodiment of a flame retardant panel 100, according to the invention. It will be noted, however, that the panels 204, 206 of the flooring apparatus 200 have a first thickness T thereof in sections of the exterior face 208 which are aligned with spaces, as illustrated at 212, which are defined by the longitudinal rails 214, 216, 218, and cross members 220 of the support frame 202, and a second, thinner, thickness t in sections of the flooring panels 204, 206, 206 aligned above the various members 214, 216, 218, 220 of the support frame 220, when the flooring panels 204, 206, 206 are placed in position on the support frame 202. This arrangement of two thicknesses T, t is utilized in the exemplary embodiment of the flooring apparatus 200, so that the smaller thickness t can match the thickness, for example, three-quarters of an inch, of prior and existing floor panels used in conveyances such as rail cars and/or buses. The thickness T of the panels 204, 206, 206 is increased in areas where the panels 204, 206, 206 do not rest on the support frame 202, in order to provide room for the primary core to be made thicker, to thereby provide increased thermal and acoustic insulation, and increased structural stiffness in the floor panels 204, 206, 206 of the exemplary embodiment of the flooring apparatus 200, according to the invention.

In embodiments of the floor apparatus 200, wherein the floor panels 204, 206, 206 include ribs of phenolic reinforced material extending between a first and a second skin of the floor panels 204, 206, 206, in the manner illustrated by the ribs 140 in FIGS. 2-4 for the first exemplary embodiment 100, the ribs will preferably be positioned to extend substantially perpendicularly across the shorter dimension of the spaces 212 within the support frame 202. In the flooring panels 202, 206, 206 of the exemplary embodiment of the flooring apparatus 200, for example, all ribs within the panels 204, 206, 206 would preferably be oriented in a substantially longitudinal direction parallel to the longitudinal side and middle rails 214, 216, 218.

The floor panels 204, 206, 206 may be attached to the support frame 202 by any appropriate method, or combination of methods. For example, the floor panels 204, 206, 206 may be adhesively bonded to the support frame with an adhesive, such as a moisture curing urethane. Alternatively, or in addition to adhesively bonding the floor panels 204, 206, 206 to the support frame 202, fasteners, such as screws, bolts, rivets, etc. may also be utilized for attaching the floor panels 204, 206, 206 to the support frame 202.

Figure 7A:
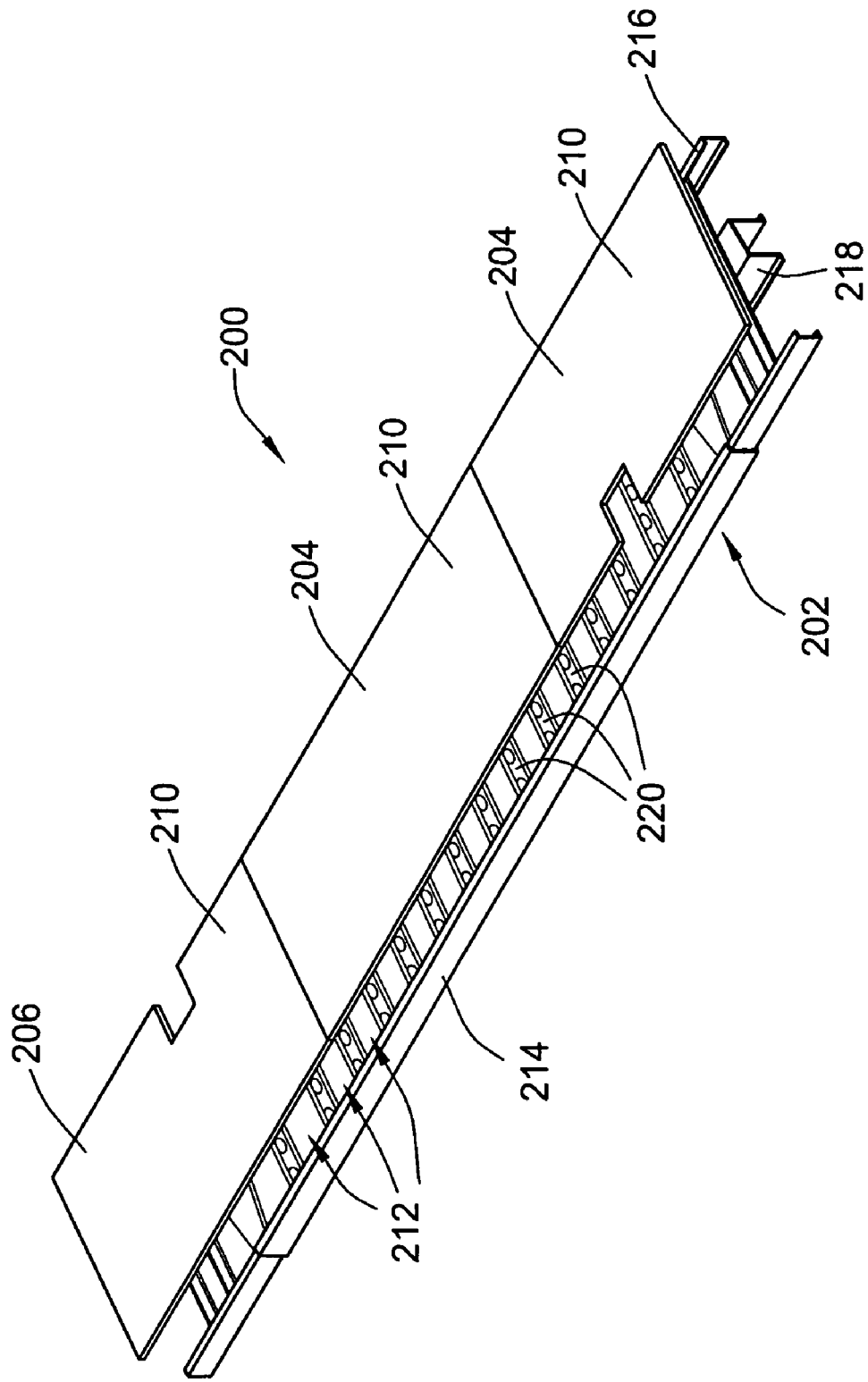
FIGS. 7A-7E are perspective, plan, and elevation views of a fire retardant panel apparatus, according to the invention, in the form of a flooring apparatus for a mass transit rail car.
Figure 7B:
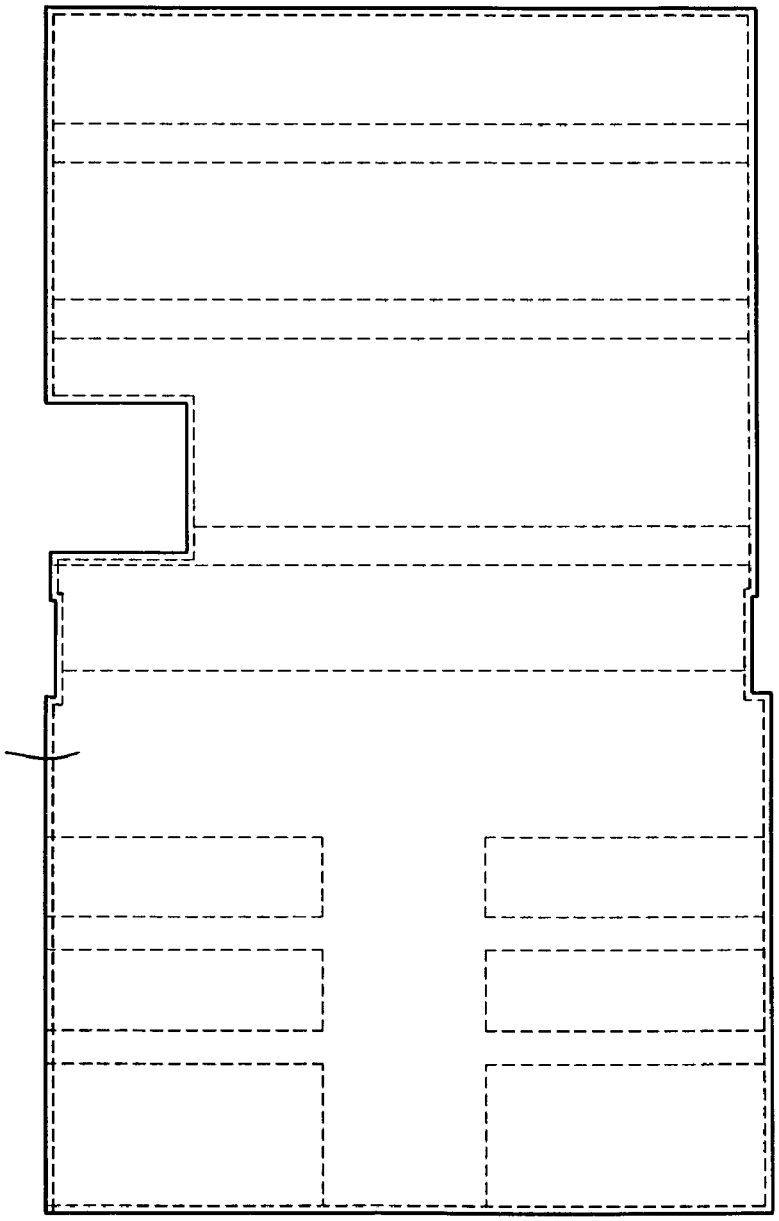
Figure 7C:
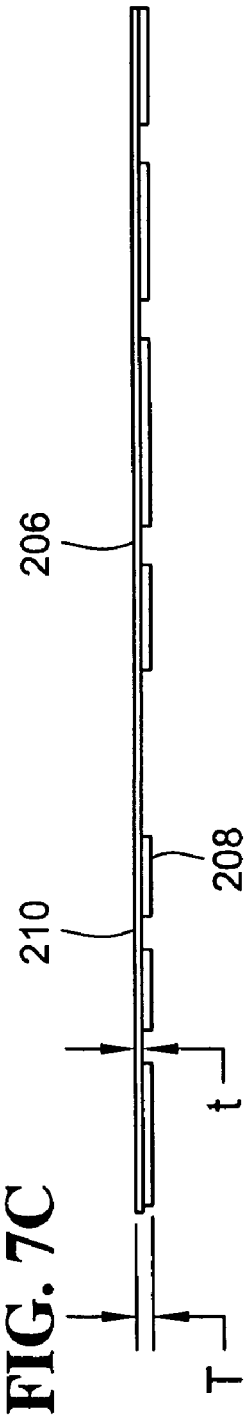
Figure 7D:
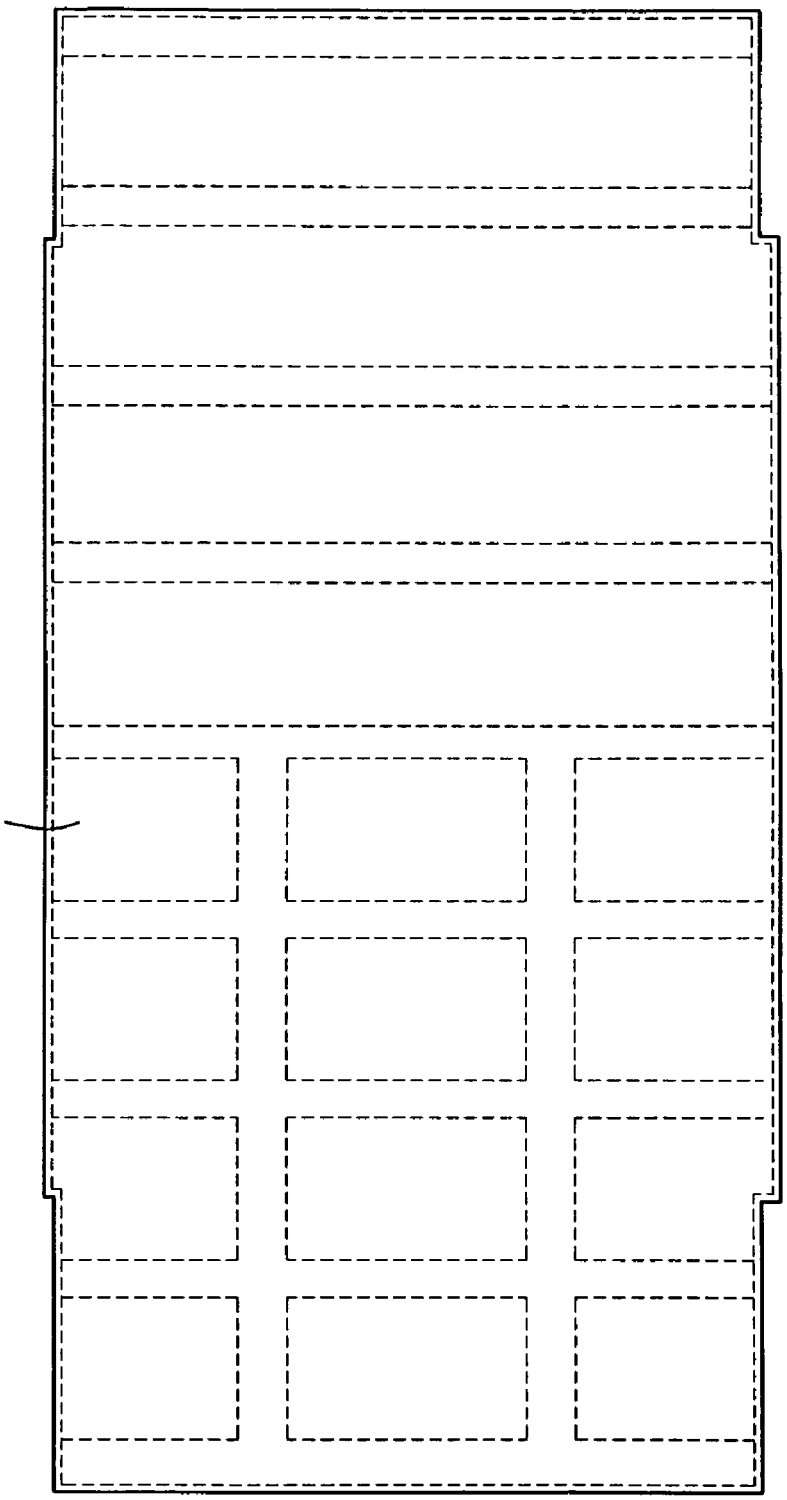
Figure 7E:
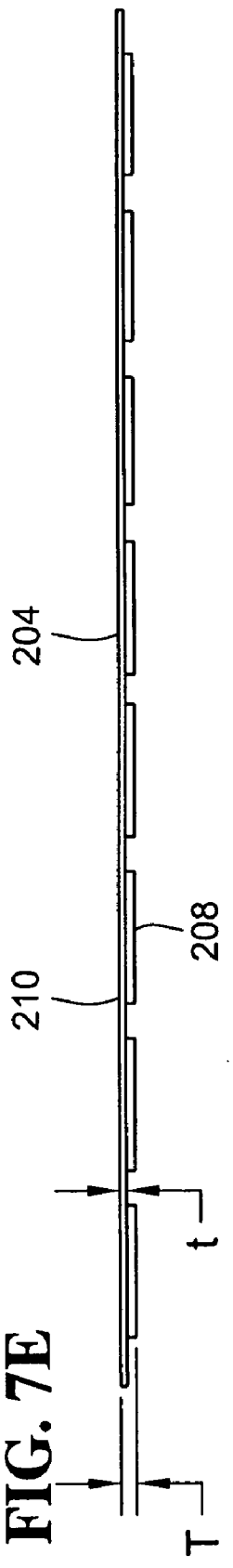

FIGS. 8A-8C illustrate another embodiment of a floor panel 300, for use in a flooring apparatus, according to the invention. The flame retardant floor panel 300 is configured for attachment to a support frame (not shown) of the type illustrated by the support frame 202 in FIG. 7A having a series of cross members which would be received in reduced thickness sections 302 of the panel 300. The panel 300 also includes additional reduced thickness sections 304 configured for resting upon longitudinal rails of a support frame, in the same manner as illustrated in FIG. 7A for the flooring apparatus 200. Through comparison of the drawings illustrating the flooring apparatus 200, and the flooring panel 300, it will be appreciated that whereas the flooring panels 204, 206,

206 of the flooring apparatus 200 had a major axis thereof oriented substantially longitudinally with respect to the support frame 200, the panels 300 are configured to have a major axis of the panels 300 oriented substantially transversely to the longitudinal axis of the support frame to which the panels 300 are attached.

As shown in FIGS. 9A-9D where a flame retardant panel 100, according to the invention, includes sections of a first and a second thickness T, t, the layer of flame retardant material 130 may be different in the area of greater thickness T, than in the area of lesser thickness t. For example, as shown in FIG. 9B, where the flame retardant panel 100 is thicker, the layer of flame retardant material may be constructed in accordance with the embodiment illustrated in FIG. 2, while, in the areas of the exterior face in which the panel has a lesser thickness, the layer of flame retardant material 130 may be constructed in accordance with the embodiment illustrated in FIG. 4. In other embodiments of the invention, not having sections of differing thickness, the layer of flame retardant material may be constructed differently in various sections of the panel. Also, as indicated in FIG. 9C, where a panel 100, according to the invention, includes a reduced thickness section t disposed inwardly from the periphery 105 of the panel 100, the panel 100 may include a channel-shaped structure 166, of reinforced phenolic material, or another appropriate material.

Figure 10:
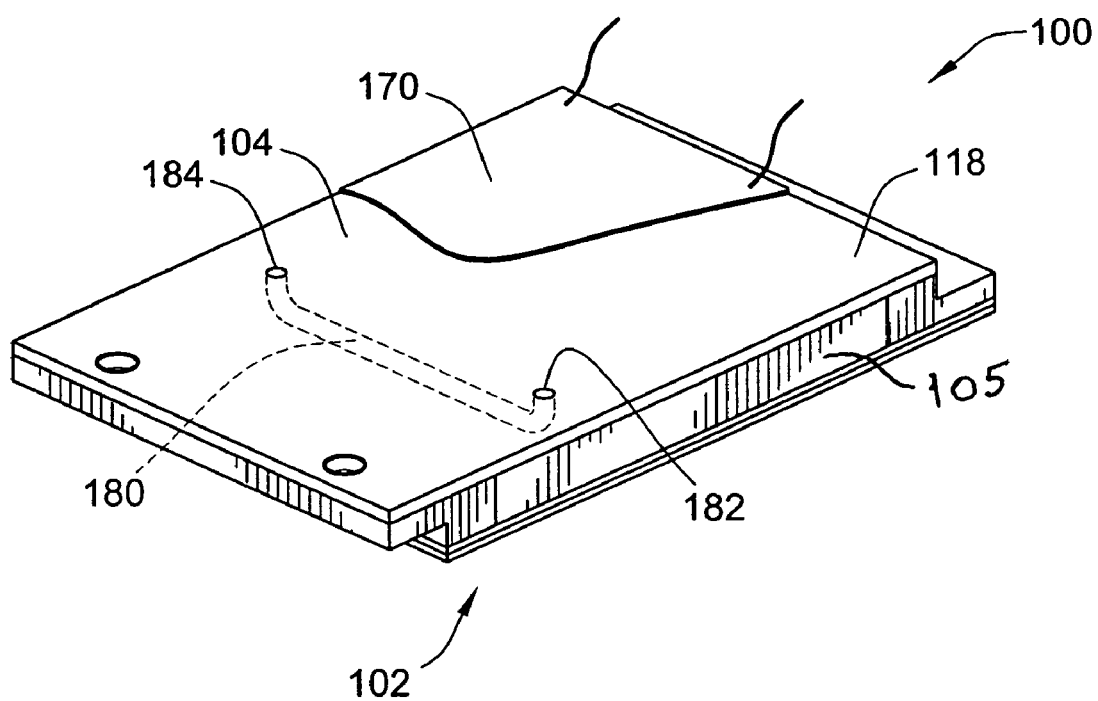
FIG. 10 illustrates alternate embodiments of the exemplary embodiment of the fire retardant panel shown in FIG. 1, wherein the alternate embodiments include a heating element attached to an interior surface of the panel, and a conduit disposed within the panel for passage of wires, or the like through the panel.

As shown in FIG. 10, a flame retardant panel 100, according to the invention, may include a heating element 170 attached to, or embedded into the first skin 118 of the panel, for providing heating of the interior surface of the panel.

As also shown in FIG. 10, a flame retardant panel 100, according to the invention, may also include one or more conduits 180 of plastic, metal composite, or pultruded composite, for example, embedded within the panel 100, and having first and second openings 182, 184 into the conduit 180, through at least one of the interior or exterior faces 102, 104 or the perimeter 105 of the panel.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A flame retardant panel, having an exterior face thereof adapted for attachment to a support frame and an interior face thereof adapted for defining a boundary of a compartment, the flame retardant panel comprising:

a panel structure including a primary core encapsulated within a panel frame of reinforced phenolic material, the primary core having first and second faces thereof, and a periphery thereof, the panel frame including first and second skins, attached to the first and second faces of the primary core, and one or more closeouts disposed between the skins about the periphery of the primary core, with the one or more closeouts being attached to the periphery of the primary core and to the first and second skins; and a layer of flame retardant material attached to the second skin of the panel frame and extending outwardly therefrom to at least partially define the exterior face of the flame retardant panel, the layer of flame retardant material comprising:

a secondary core of material from the group consisting of balsa wood, phenolic foam, and melamine foam, an additional skin of reinforced phenolic material defining a first face thereof attached to the secondary core and a second face thereof opposite the secondary core, wherein the secondary core is sandwiched between and attached to the second skin of the composite support structure and the additional skin, and, with the additional skin being integrally joined to the remainder of the panel frame, to thereby fully encapsulate the secondary core within the reinforced phenolic material comprising the panel frame, and a layer of intumescent material having a composite structure and comprising a coating containing an intumescent material bonded onto the second face of the additional skin, wherein the intumescent material is disposed in a fibrous mat;

wherein, the layer of intumescent material includes a cured epoxy resin to form a pre-cured layer of intumescent material, and the panel further includes an adhesive bonding the pre-cured layer of intumescent material to the second face of the additional skin.

2. A flame retardant panel, having an exterior face thereof adapted for attachment to a support frame and an interior face thereof adapted for defining a boundary of a compartment, the flame retardant panel comprising:

a panel structure including a primary core encapsulated within a panel frame of reinforced phenolic material, the primary core having first and second faces thereof, and a periphery thereof, the panel frame including first and second skins, attached to the first and second faces of the primary core, and one or more closeouts disposed between the skins about the periphery of the primary core, with the one or more closeouts being attached to the periphery of the primary core and to the first and second skins; and a layer of flame retardant material attached to the second skin of the panel frame and extending outwardly therefrom to at least partially define the exterior face of the flame retardant panel, the layer of flame retardant material comprising:
  a secondary core of material from the group consisting of balsa wood, phenolic foam, and melamine foam,
  an additional skin of reinforced phenolic material defining a first face thereof attached to the secondary core and a second face thereof opposite the secondary core, wherein the secondary core is sandwiched between and attached to the second skin of the composite support structure and the additional skin, and, with the additional skin being integrally joined to the remainder of the panel frame, to thereby fully encapsulate the secondary core within the reinforced phenolic material comprising the panel frame, and
  a layer of intumescent material having a composite structure and comprising a coating containing an intumescent material bonded onto the second face of the additional skin, wherein the intumescent material is disposed in a fibrous mat;
wherein, the layer of intumescent material is impregnated with phenolic resin, placed against the second face of the additional skin of reinforced phenolic resin and co-cured therewith.

3. A flame retardant panel, having an exterior face thereof adapted for attachment to a support frame and an interior face thereof adapted for defining a boundary of a compartment, the flame retardant panel comprising:
  a panel structure including a primary core encapsulated within a panel frame of reinforced phenolic material, the primary core having first and second faces thereof, and a periphery thereof, the panel frame including first and second skins attached to the first and second faces of the primary core, one or more ribs of reinforced phenolic material connecting the first and second skins to one another and disposed inwardly from the periphery of the primary core, and one or more closeouts disposed between the skins about the periphery of the primary core, with the one or more closeouts being attached to the periphery of the primary core and to the first and second skins; and
  a layer of flame retardant material attached to the second skin of the panel frame and extending outwardly therefrom to at least partially define the exterior face of the flame retardant panel
  wherein:
    the panel defines a longitudinal axis thereof, a transverse axis thereof extending substantially perpendicularly to the longitudinal axis, and a thickness thereof extending substantially orthogonally to both the longitudinal and transverse axes of the panel, with both the longitudinal and transverse axes lying substantially within a plane defined by the interior face of the panel; and
    the first and second skins comprise a stitched composite reinforcing structure of fibrous material, impregnated with phenolic resin;
    the reinforcing structure of the skins having first second and third layers, the first layer being disposed adjacent the primary core and comprised of substantially randomly directed fibers, the second layer being disposed against the first layer and comprising substantially longitudinally directed fibers, and the third layer being disposed against the second layer and comprising substantially transversely directed fibers, with the first, second, and third layers being stitched together by stitching extending at least partially orthogonally to the longitudinal and transverse axes.

4. A flame retardant panel, having an exterior face thereof adapted for attachment to a support frame and an interior face thereof adapted for defining a boundary of a compartment, the flame retardant panel comprising:
  a panel structure including a primary core encapsulated within a panel frame of reinforced phenolic material, the primary core having first and second faces thereof, and a periphery thereof, the panel frame including first and second skins, attached to the first and second faces of the primary core, and one or more closeouts disposed between the skins about the periphery of the primary core, with the one or more closeouts being attached to the periphery of the primary core and to the first and second skins;
  a layer of flame retardant material attached to the second skin of the panel frame and extending outwardly therefrom to at least partially define the exterior face of the flame retardant panel; and
  a heating element adjacent the interior face of the panel.

5. A flame retardant panel, having an exterior face thereof adapted for attachment to a support frame and an interior face thereof adapted for defining a boundary of a compartment, the flame retardant panel comprising:
  a panel structure including a primary core encapsulated within a panel frame of reinforced phenolic material, the primary core having first and second faces thereof, and a periphery thereof, the panel frame including first and second skins, attached to the first and second faces of the primary core, and one or more closeouts disposed between the skins about the periphery of the primary core, with the one or more closeouts being attached to the periphery of the primary core and to the first and second skins; and
  a layer of flame retardant material attached to the second skin of the panel frame and extending outwardly therefrom to at least partially define the exterior face of the flame retardant panel,
  wherein the panel defines a longitudinal axis thereof, a transverse axis thereof extending substantially perpendicularly to the longitudinal axis, and a thickness thereof extending substantially orthogonally to both the longitudinal and transverse axes of the panel, with both the longitudinal and transverse axes lying substantially within a plane defined by the interior face of the panel,
  wherein the thickness of the panel varies and includes at least a first and a second thickness thereof, within the periphery of the primary core, and
  wherein the layer of flame retardant material attached to the second skin of the panel frame and extending outwardly therefrom to at least partially define the exterior face of the panel extends across the entirety of the exterior face of the panel, throughout both the first and second thicknesses of the panel.

6. The flame retardant panel of any one of claim 1, 2, 4, or 5, further comprising, one or more ribs of reinforced phenolic material connecting the first and second skins to one another and disposed inwardly from the periphery of the primary core.

7. The flame retardant core of claim 6, wherein, the primary core is a pre-cured reinforced core, including at least one reinforced phenolic rib and two or more foam strips, the at least one phenolic rib being positioned between two adjacent ones of the two or more foam strips.

8. The flame retardant panel of any one of claim 1, 2, 3, 4, or 5, wherein, one or more of the one or more closeouts is machineable to include at least one mating surface.

9. The flame retardant panel of claim 8, wherein, the mating surface is a lap joint.

10. The flame retardant panel of claim 9, wherein, the interior face of the panel defines a plane of the panel, the closeout includes at least one bore therethrough extending substantially perpendicularly to the plane of the panel.

11. The flame retardant panel of any one of claim 1, 2, 3, 4, or 5, wherein, the primary core further comprises at least one tapping block, with the tapping block including a block of reinforced phenolic material and a metal plate encapsulated within the block, the tapping plate being adapted to be drilled and tapped so as to provide the panel with a mounting area.

12. The flame retardant panel of any one of claim 1, 2, 3, 4, or 5, wherein, the primary core comprises a plastic closed cell foam of polyisocyanurate material.

13. The flame retardant panel of any one of claim 1, 2, 3, 4, or 5, wherein, the primary core comprises a balsa wood material.

14. The flame retardant panel of claim 4, wherein, the heating element is embedded into the first skin of the panel, and integrally joined thereto by the phenolic material.

15. The flame retardant panel of claim 5, wherein, the layer of flame retardant material attached to the second skin of the panel frame and extending outwardly therefrom to at least partially define the exterior face of the panel extends only partially across the entirety of the exterior face of the panel, throughout one but not both of the first and second thicknesses of the panel.

16. A flame retardant panel, having an exterior face thereof adapted for attachment to a support frame and an interior face thereof adapted for defining a boundary of a compartment, the flame retardant panel comprising:
a panel structure including a primary core encapsulated within a panel frame of reinforced phenolic material, the primary core having first and second faces thereof, and a periphery thereof, the panel frame including first and second skins, attached to the first and second faces of the primary core, and one or more closeouts disposed between the skins about the periphery of the primary core, with the one or more closeouts being attached to the periphery of the primary core and to the first and second skins; and
a layer of flame retardant material attached to the second skin of the panel frame and extending outwardly therefrom to at least partially define the exterior face of the flame retardant panel,
wherein the panel defines a longitudinal axis thereof, a transverse axis thereof extending substantially perpendicularly to the longitudinal axis, and a thickness thereof extending substantially orthogonally to both the longitudinal and transverse axes of the panel, with both the longitudinal and transverse axes lying substantially within a plane defined by the interior face of the panel,
wherein the thickness of the panel varies and includes at least a first and a second thickness thereof, within the periphery of the primary core, and
wherein the layer of flame retardant material attached to the second skin of the panel frame and extending outwardly therefrom to at least partially define the exterior face of the panel comprises:
a first flame retardant structure in areas of the panel having the first thickness; and
a second flame retardant structure in areas of the panel having the second thickness.

17. The flame retardant panel of claim 16, wherein the first flame retardant structure of the layer of flame retardant material comprises, a secondary core of material from the group comprising balsa wood, phenolic foam, and melamine foam, and an additional skin of reinforced phenolic material, with the secondary core being sandwiched between and attached to the second skin of the composite support structure and the additional skin, and, with the additional skin being integrally joined to the remainder of the panel frame, to thereby fully encapsulate the secondary core within the reinforced phenolic material comprising the panel frame.

18. The flame retardant panel of claim 17, wherein, the second flame retardant structure of layer of flame retardant material comprises a layer of intumescent material attached to the second face of the second skin.

19. The flame retardant panel of claim 18, wherein, the layer of intumescent material is bonded onto the second face of the second skin.

20. The flame retardant panel of claim 19, wherein, the layer of intumescent material comprises a coating containing an intumescent material.

21. The flame retardant panel of claim 19, wherein, the layer of intumescent coating is a composite structure including an intumescent material disposed in a fibrous mat.

22. The flame retardant panel of claim 21, wherein, the layer of intumescent material includes a cured epoxy resin to form a pre-cured layer of intumescent material, and the panel further includes an adhesive bonding the pre-cured layer of intumescent material to the second face of the additional skin.

23. The flame retardant panel of claim 21, wherein, the layer of intumescent material is impregnated with phenolic resin, placed against the second face of the additional layer of reinforced phenolic resin and co-cured therewith.

24. A flame retardant panel, having an exterior face thereof adapted for attachment to a support frame and an interior face thereof adapted for defining a boundary of a compartment, the flame retardant panel comprising:
a panel structure including a primary core encapsulated within a panel frame of reinforced phenolic material, the primary core having first and second faces thereof, and a periphery thereof, the panel frame including first and second skins, attached to the first and second faces of the primary core, and one or more closeouts disposed between the skins about the periphery of the primary core, with the one or more closeouts being attached to the periphery of the primary core and to the first and second skins; and
a layer of flame retardant material attached to the second skin of the panel frame and extending outwardly therefrom to at least partially define the exterior face of the flame retardant panel; and
a conduit embedded within the panel and having first and second openings into the conduit through at least one of the interior or exterior faces or the perimeter of the panel.

25. A flame retardant panel apparatus, having multiple interconnected panels each including an exterior face thereof adapted for attachment to a support frame and an interior face thereof adapted for defining a boundary of a compartment, with at least one of the panels of the flame retardant panel apparatus being a flame retardant panel comprising:
a panel structure including a primary core encapsulated within a panel frame of reinforced phenolic material, the primary core having first and second faces thereof, and a periphery thereof, the panel frame including first and second skins, attached to the first and second faces of the primary core, and one or more closeouts disposed between the skins about the periphery of the primary core, with the one or more closeouts being attached to the periphery of the primary core and to the first and second skins; and a layer of flame retardant material attached to the second skin of the panel frame and extending outwardly therefrom to at least partially define the exterior face of the panel, wherein the flame retardant panel defines a longitudinal axis thereof, a transverse axis thereof extending substantially perpendicularly to the longitudinal axis, and a thickness thereof extending substantially orthogonally to both the longitudinal and transverse axes of the panel, with both the longitudinal and transverse axes lying substantially within a plane defined by the interior face of the panel, wherein the thickness of the fire retardant panel varies and includes at least a first and a second thickness thereof, within the periphery of the primary core, and wherein, the layer of flame retardant material attached to the second skin of the panel frame and extending outwardly therefrom to at least partially define the exterior face of the panel extends across the entirety of the exterior face of the panel, throughout both the first and second thicknesses of the panel.

26. A flame retardant panel apparatus, having multiple interconnected panels each including an exterior face thereof adapted for attachment to a support frame and an interior face thereof adapted for defining a boundary of a compartment, with at least one of the panels of the flame retardant panel apparatus being a flame retardant panel comprising:

a panel structure including a primary core encapsulated within a panel frame of reinforced phenolic material, the primary core having first and second faces thereof, and a periphery thereof, the panel frame including first and second skins, attached to the first and second faces of the primary core, and one or more closeouts disposed between the skins about the periphery of the primary core, with the one or more closeouts being attached to the periphery of the primary core and to the first and second skins; and a layer of flame retardant material attached to the second skin of the panel frame and extending outwardly therefrom to at least partially define the exterior face of the panel, wherein the flame retardant panel defines a longitudinal axis thereof, a transverse axis thereof extending substantially perpendicularly to the longitudinal axis, and a thickness thereof extending substantially orthogonally to both the longitudinal and transverse axes of the panel, with both the longitudinal and transverse axes lying substantially within a plane defined by the interior face of the panel, wherein the thickness of the fire retardant panel varies and includes at least a first and a second thickness thereof, within the periphery of the primary core, and the flame retardant panel further comprises:
a first flame retardant structure in areas of the panel having the first thickness; and
a second flame retardant structure in areas of the panel having the second thickness.

27. The flame retardant panel apparatus of any one of claim 25 or 26, wherein, the layer of flame retardant material comprises, a secondary core of material from the group comprising balsa wood, phenolic foam, and melamine foam, and an additional skin of reinforced phenolic material, with the secondary core being sandwiched between and attached to the second skin of the composite support structure and the additional skin, and, with the additional skin being integrally joined to the remainder of the panel frame, to thereby folly encapsulate the secondary core within the reinforced phenolic material comprising the panel frame.

28. The flame retardant panel apparatus of claim 26, wherein, the layer of flame retardant material attached to the second skin of the panel frame and extending outwardly therefrom to at least partially define the exterior face of the panel extends only partially across the entirety of the exterior face of the panel, throughout one, but not both of, the first and second thicknesses of the panel.

29. The flame retardant panel apparatus of any one of claim 25 or 26, wherein, the panel apparatus comprises a flooring apparatus of a conveyance.

30. The flame retardant panel apparatus of claim 29, wherein, the conveyance is an elevator including a floor support structure adapted for attachment thereto of the flooring apparatus.

31. The flame retardant panel apparatus of claim 29, wherein, the conveyance is a vehicle or vessel including a floor support structure adapted for attachment thereto of the flooring apparatus.

32. The flame retardant panel apparatus of claim 31, wherein, the vehicle or vessel is a mass transit vehicle or vessel.

* * * * *